US012590630B2

(12) United States Patent
    Hansen

(10) Patent No.: US 12,590,630 B2
(45) Date of Patent: *Mar. 31, 2026

(54) METHOD AND APPARATUS FOR FLUSHING CONTAMINANTS FROM A CONTAINER OF FLUIDS

(71) Applicant: Dennis B. Hansen, New Hampton, IA (US)

(72) Inventor: Dennis B. Hansen, New Hampton, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/050,870

(22) Filed: Feb. 11, 2025

(65) Prior Publication Data

US 2025/0215969 A1     Jul. 3, 2025

Related U.S. Application Data

(63) Continuation of application No. 18/228,442, filed on Jul. 31, 2023, which is a continuation-in-part of application No. 17/120,527, filed on Dec. 14, 2020, now abandoned.

(60) Provisional application No. 63/418,776, filed on Oct. 24, 2022, provisional application No. 63/014,972, filed on Apr. 24, 2020, provisional application No. 62/947,897, filed on Dec. 13, 2019.

(51) Int. Cl.
    *F16H 57/04*     (2010.01)
    *B08B 9/08*      (2006.01)
    *B08B 13/00*     (2006.01)
    *F01M 11/04*     (2006.01)

(52) U.S. Cl.
    CPC ........... *F16H 57/0408* (2013.01); *B08B 9/08* (2013.01); *B08B 13/00* (2013.01); *F16H 57/0402* (2013.01); *B08B 2209/08* (2013.01); *F01M 11/0458* (2013.01)

(58) Field of Classification Search
    CPC .............. B08B 9/0436; B08B 2209/04; B08B 2209/022; F01P 11/06; F01M 11/0458; F16H 57/0402
    See application file for complete search history.

(56) References Cited

U.S. PATENT DOCUMENTS

| | | |
|---|---|---|
| 7,056,442 B2 | 6/2006 | Hansen |
| 7,510,662 B1 | 3/2009 | Hansen |
| 2004/0194975 A1 | 10/2004 | Trumper |
| 2005/0126271 A1 | 6/2005 | Gorski et al. |

FOREIGN PATENT DOCUMENTS

| | | |
|---|---|---|
| KR | 100192466 B1 | 6/1999 |
| KR | 20110091914 A | 8/2011 |

*Primary Examiner* — Natasha N Campbell
(74) *Attorney, Agent, or Firm* — Simmons Perrine PLC

(57) ABSTRACT

A contaminant-flushing machine for removing contaminants from a container, such as an engine transmission, air-conditioner coil, or transmission cooler, which includes hoses for coupling to the transmission cooler and a pump for circulating fluid through the hoses and the transmission cooler, the flushing machine being configured to terminate all circulating of fluid when a pressure drop is detected during times when the fluid is circulating only in the primary flow direction, but not when the flow direction is being reversed.

20 Claims, 3 Drawing Sheets

METHOD AND APPARATUS FOR FLUSHING CONTAMINANTS FROM A CONTAINER OF FLUIDS

CROSS-REFERENCE TO RELATED APPLICATIONS

This application claims the benefit of the filing dates of two provisional applications: provisional application having Ser. No. 62/947,897 entitled "AVIATION HOT FLUSH," filed by Dennis B. Hansen on Dec. 13, 2019, and provisional application having Ser. No. 63/014,972 with the same title, filed by Dennis B. Hansen on Apr. 24, 2020, which are both incorporated herein in their entirety by this reference. This application is a continuation of non-provisional application having the Ser. No. 18/228,442, filed Jul. 31, 2023, which application is a continuation-in-part and also claims the benefit of the filing date of non-provisional application having Ser. No. 17/120,527, field Dec. 13, 2020, entitled Method and Apparatus for Flushing Contaminants from a Container of Fluids by the same inventor which claims the benefit of the above-mentioned two provisional applications. In addition, this application claims the benefit of the provisional application having Ser. No. 63/418,776 filed Oct. 24, 2022, by the same inventor.

BACKGROUND OF THE INVENTION

The present invention generally relates to fluid filtering, and more particularly relates to a method and apparatus for removing contaminants from a container having petroleum-based fluids therein, through a process of circulating, heating and filtering such fluids outside of the container.

In the past, automotive engineers and technicians have been among the many people to recognize the need for an ability to flush contaminants from fluid-containing enclosures or systems. One example of such a fluid-containing system is a transmission/transmission cooler system in which transmission fluid therein is normally cooled during operation of a vehicle by passing the transmission fluid through the transmission cooler. Such systems frequently contain tiny metal shavings resulting from wear of internal parts. It is desirable to provide an effective way to remove such metal shavings and other contaminants from the system without the need for completely dismantling the transmission and cooling system.

Systems for extracting transmission fluid from the system, then heating it and circulating this fluid through an external filter to thereby flush out contaminants from the transmission and cooling system, have enjoyed considerable success in the past. U.S. Pat. No. 7,510,662 issued to Dennis Hansen, provides much information regarding these systems. These systems have been commercially available to be purchased from Hot Flush Inc. of New Hampton, IA which can be found at www.hotflusher.com. Hot Flush Inc. has sold two oil cooler flushers having Model numbers HF345S4 and HF345S9. These cooler flushers are well known in the art. These systems include therein a reverser valve for quickly reversing and then re-reversing, the flow through the cooler while it is being flushed. Normally, there are two hoses from the flusher to the cooler to be flushed, one which is the return from the cooler to the flusher and the other is the hose which normally provides heated oil into the cooler to be flushed.

These cooler flushers, in the early years, were used largely for the automotive industry. More recently, their use has expanded to include many different industries including, aviation, military, construction equipment, agriculture, etc.

The temperature of the cleaning fluid, its pressure and its flow rate depend upon the industry being serviced. For example, in the aviation industry, the cost of the equipment being serviced can often be tens of millions of dollars. With higher pressures, higher temperatures, and higher flow rates, around high cost equipment being serviced it is increasingly important to limit the impact of potential mishaps occurring with respect to the hot flusher machines.

Consequently, there exists a need for improved methods and apparatuses for flushing contaminants from a fluid container.

SUMMARY OF THE INVENTION

It is an object of the present invention to provide an enhanced ability to reduce the adverse effects of a mishap involving a hot flusher machine.

It is a feature of the present invention to rapidly reduce a rate of leakage, or unwanted discharge, of cleaning fluid.

It is an advantage of the present invention to reduce the risk of injury to personnel and equipment that might be impacted by a sudden release of fluid from the hot flusher machine.

The present invention is an improved method and apparatus for removing contaminants from a container having fluids and contaminants therein, designed to satisfy the aforementioned needs, provide the previously stated objects, include the above-listed features, and achieve the already articulated advantages. The present invention is carried out in an "excessive rapid leakage-less" system in the sense that a substantial reduction in time required to stop a sudden unintended discharge of cleaning fluid is achieved. The present invention is further carried out in a "wasted automatic transmission fluid (ATF)-less" manner in the sense that a substantial reduction in ATF lost during a sudden leakage event is achieved with the present invention.

Accordingly, the present invention is a method and apparatus for detecting a sudden excessive leakage event and rapidly limiting effects of the event.

BRIEF DESCRIPTION OF THE DRAWINGS

The invention may be more fully understood by reading the following description of preferred embodiments of the invention, in conjunction with the appended drawings wherein.

DETAILED DESCRIPTION

Figure 1:
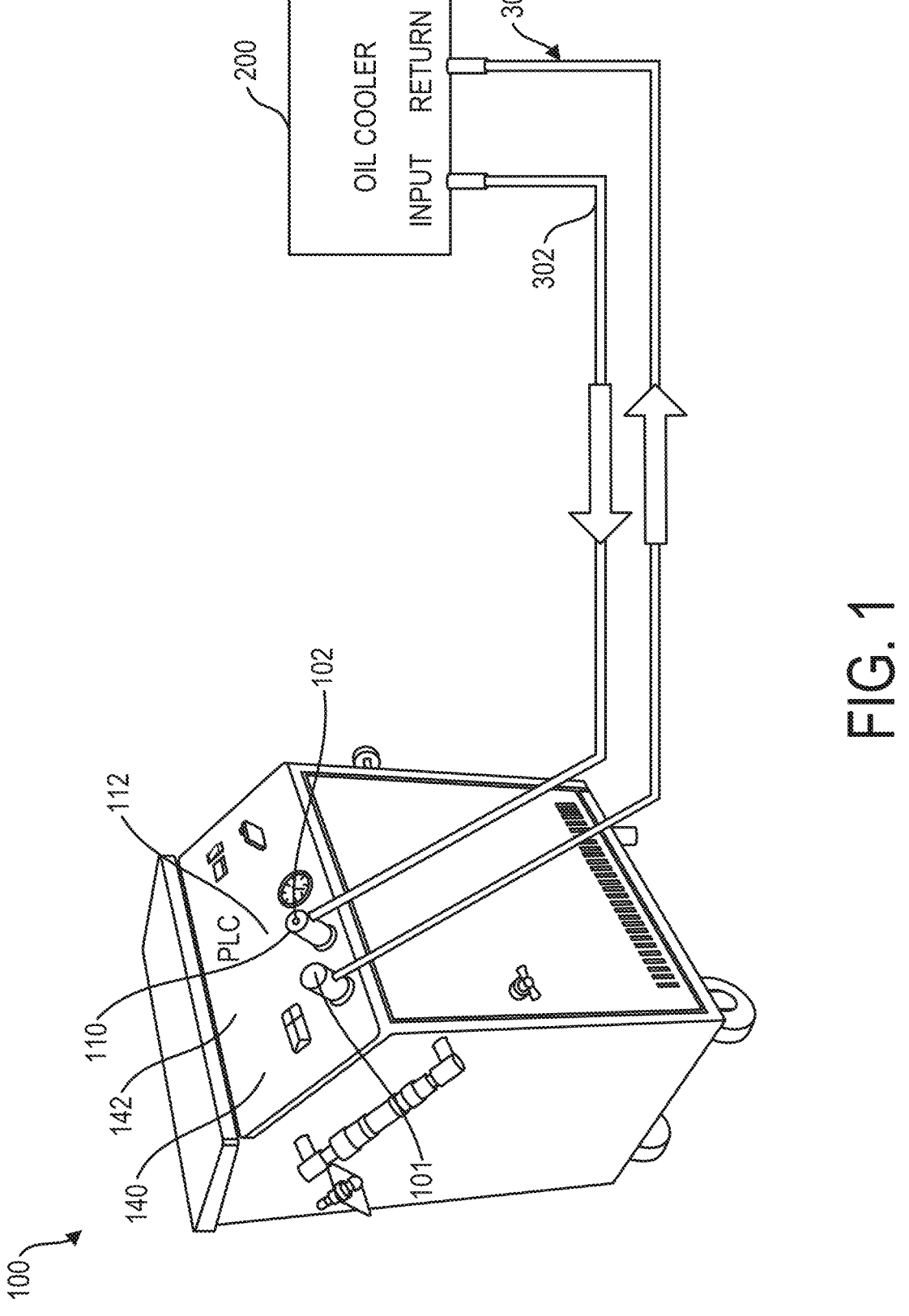
FIG. 1 is a simplified diagram showing contaminant-flushing machine of the present invention. The arrows show direction of flow of cleaning fluid through the hoses 301 and 302.

Now referring to FIG. 1, there is shown a simplified diagram of an improved contaminant-flushing machine, of the present invention, generally designated 100, which is coupled to an automobile transmission cooler 200 by connecting hoses 301 and 302. In normal operation, the flushing machine 100 back flushes the oil cooler in the sense that heated cleaning fluid is provided on hose 301 from the flusher machine 100 to the oil cooler connection which would normally return the oil to the transmission etc. from the cooler after it has been cooled in normal operation of the vehicle. This is labeled in FIG. 1 as RETURN in the oil cooler 200. I.e. the flusher machine is pumping heated fluid backward through the oil cooler 200 from the RETURN connection through the cooler and out the INPUT connection, where it flows back to the flusher machine 100 where hose 302 couples to connector 102. In some embodiments of the present invention, the connection between hose 302 and the flusher machine 100 could be identical to prior art flusher machines made for years by HotFlush Inc. However, in FIG. 1, connector 102 is shown as a special connector which has built therein a pressure sensor or pressure switch which detects the level of pressure in hose 302 and emits a signal on line 112 to programmable logic controller (PLC) 110. Also shown is multi-sensor and communication module 140 which is coupled to PLC via communication path 142. Module 140 can include fire and smoke detector and accelerometers for detecting motion. Module 140 may also include wireless communication equipment for WIFI or mobile phone connections for reporting events and conditions of the flushing machine 100 to remote locations. While connector 102 is shown as being a pressure sensor coupled to PLC 110, it should be understood that the pressure sensor for detecting the pressure in the line 302 could be located anywhere between the oil cooler 200 and the reverser, which is a standard portion of prior at Hot Flush Inc. flushing machines. In one embodiment, the pressure sensor of connector 102 could be moved to an inline connector just before connection to the reverser. Module 140 could also be configured to emit an audible alarm when commanded.

The general concept of the present invention is that once the flusher machine 100 is started and running, and between normal short duration reversal cycles, and if the PLC 110 would detect a drop in pressure from sensor 102, or a substitute sensor located elsewhere along line 302, PLC could command the heater and pump of the flusher machine 100 to stop. This could be accomplished by shutting down electric power at a circuit breaker on the flusher machine 100. In one embodiment, there could be delays created in commanding a low pressure shutdown when the flushing machine is first started, for example, for 3-10 seconds, and during the very short duration flow reversals which are part of the normal operation of the flusher machine 100. The PLC could be programmed to ignore drops in pressure which occur during the times that a reversal is commanded or if they are shorter than a predetermined time period, which is longer than the normal time for reversal of the flow during reversal cycles. Alternatively, the sensor 102 or its substitute could be programmed to not provide a signal during times when a reversal is commanded or unless the duration of the low pressure situation is longer than the predetermined duration of the normal reversal cycles.

Figure 2A:
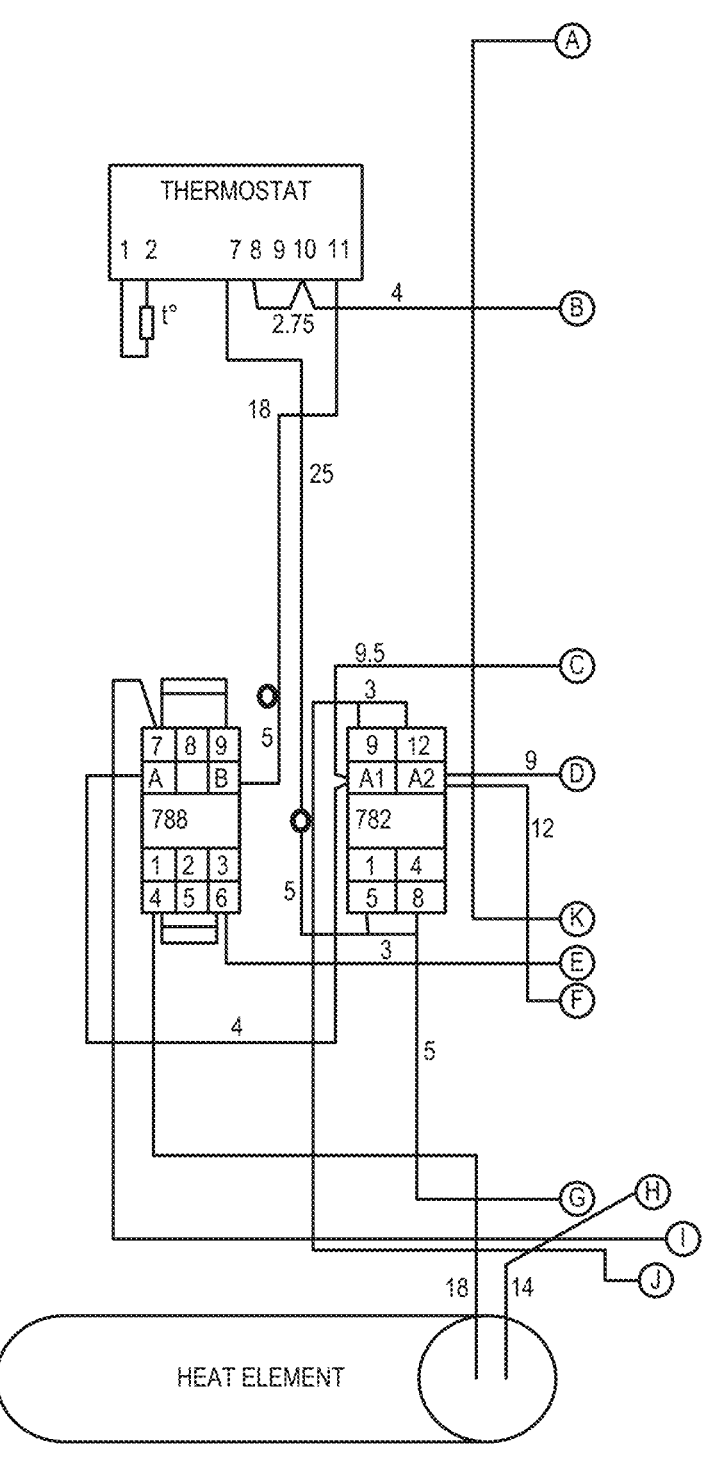
FIG. 2A and FIG. 2B are a schematic diagram of a control system for operation of the method and apparatus of the present invention.
Figure 2B:
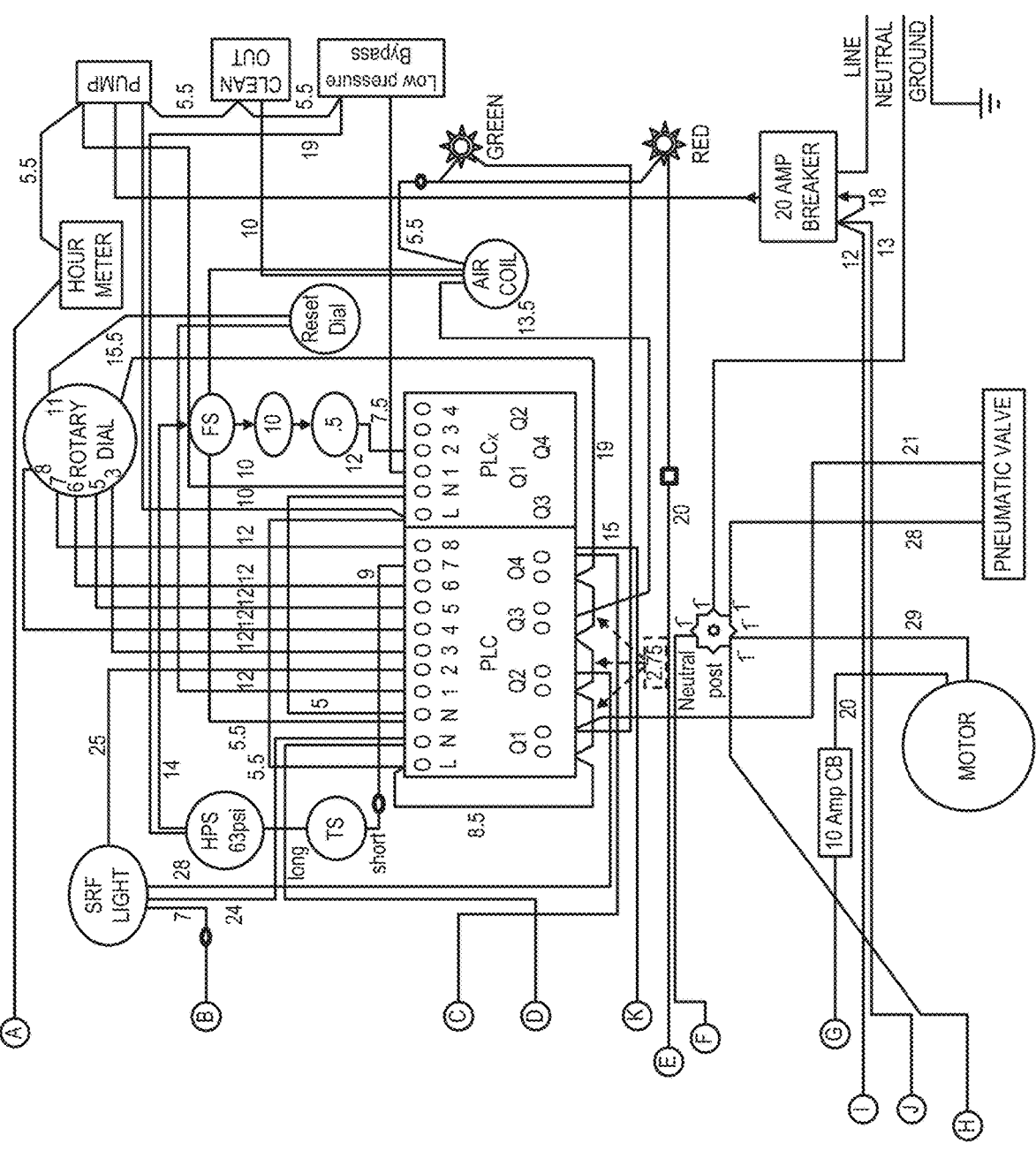

Now referring to FIGS. 2A and 2B, there is shown a schematic diagram of a control circuit of the present invention which provides electronic details of the system and method of the present invention.

Throughout this disclosure and description, the Applicant refers to a transmission cooler, oil coolers, transmission fluid, oil and other examples. These references are merely exemplary of the many different types of fluid containers and fluid types which could be utilized in conjunction with the present invention. For example, the present invention is intended to include and address systems for cleaning engine oil from an internal combustion engine, hydraulic oil from a hydraulic system, as well as fluid used in air-conditioning equipment. Various other systems, fluids and containers are contemplated and could be readily substituted, still within the spirit and scope of the present invention. The present invention can be used for oil cooler and oil lines in aircraft, jet engines, bulldozers, windmill electric generators and numerous other systems and fluid containers.

It is thought that the method and apparatus of the present invention will be understood from the foregoing description, and it will be apparent that various changes may be made in the form, construction, steps and arrangement of the parts and steps thereof without departing from the spirit and scope of the invention or sacrificing all of the material advantages, the form herein described being merely a preferred or exemplary embodiment thereof.

I claim:

1. The method of removing contaminants from a container in a machine, said method comprising the steps of:

providing a first fluid through a container coupled to a machine;

where said container has an inlet end and an outlet end and during operation of the machine, the first fluid flows only in one direction, which is from the inlet end to the outlet end;

coupling a filter system to the container;

pumping the first fluid in a primary cleaning flow direction;

reversing a flow of said first fluid through said container;

resuming flow of the first fluid in said primary cleaning flow direction at a time within a predetermined reversal interval from when said step of reversing a flow is commenced, wherein said predetermined reversal interval is less than 10 seconds;

providing a programmable logic controller (PLC);

providing a sensor which monitors a characteristic of said first fluid, and emits signals to said PLC; and said PLC configured to command a cessation in pumping of said first fluid in any direction, when a signal is received from said sensor from a time other than during said predetermined reversal interval.

2. The method of claim 1 wherein said predetermined reversal interval is less than one second; and said step of reversing a flow is accomplished with a compressed fluid.

3. The method of claim 2 wherein said compressed fluid is compressed air.

4. The method of claim 1 further comprising the steps of providing a fire detector or a smoke detector and commanding a cessation of pumping in any direction when a signal is received from said fire detector or the smoke detector during times other than during said predetermined reversal interval.

5. The method of claim 1 wherein the sensor is a pressure sensor located in a line between the container and a reverser configured to perform the step of reversing the flow.

6. The method of claim 1 wherein the pressure sensor is a 0.5 pound PSI N/O electronic pressure switch.

7. The method of claim 6 wherein the pressure sensor is located just before the reverser.

8. The method of claim 1 further comprising the steps of providing a fire and smoke detector coupled to said PLC.

9. The method of claim 8 wherein the PLC is configured to command a cessation of all pumping when receiving a signal from said fire and smoke detector during times other than during said predetermined reversal interval.

10. The method of claim 1 wherein said primary cleaning flow direction is opposite said one direction.

11. The method of claim 1 wherein said first fluid is transmission fluid; and said container is a transmission fluid cooler.

12. The method of claim 11 wherein the transmission fluid is not used for a vehicle.

13. The method of claim 12 wherein said second fluid is air circulated around components of a windmill electric generator.

14. A method of removing matter from a reservoir in a machine, said method comprising the steps of:

providing a reservoir coupled to the machine, which reservoir is configured to contain a first fluid which, with aid from a pump, flows to a plurality of positions within said machine;

wherein, during operation of the machine, the first fluid flows only in one direction, between said plurality of positions;

coupling a filter system to receive said first fluid;

pumping the first fluid in a first flow direction, which is a primary flow direction;

stopping a flow of said first fluid in said first flow direction;

resuming flow of the first fluid in said first flow direction at a time within a predetermined interval;

wherein said predetermined interval is less than ten (10) seconds and where the first fluid flows primarily in the primary flow direction;

providing a sensor configured to detect a change in a characteristic of said machine; and providing a PLC configured to command a cessation of pumping only when a predetermined signal is received from said sensor while said first fluid is moving in said first flow direction.

15. The method of claim 14 wherein said sensor responds to a characteristic of said first fluid.

16. A method of changing characteristics of a first fluid in a transportation machine, comprising the steps of:

providing an apparatus for facilitating heat movement between said first fluid and a second fluid;

causing movement, in a dominant flow direction, said first fluid from said apparatus through a device to alter said first fluid and returning said first fluid to said apparatus;

temporarily reversing a flow direction of said first fluid through said apparatus;

resuming said dominant flow direction of said first fluid through said apparatus after an interval of less than ten (10) seconds;

terminating pumping in any direction when a signal is received from a sensor while said first fluid is flowing only in said dominant flow direction; and the apparatus is engaged with an aircraft and configured to change a first characteristic of said first fluid circulated through a jet engine.

17. The method of claim 16 where said apparatus is a cooler.

18. The method of claim 16 wherein one of said first fluid and said second fluid is oil.

19. The method of claim 18 where said device affects a distribution of matter in said oil.

20. The method of claim 19 wherein said device is a filter, said apparatus is an oil cooler.

* * * * *